US008904028B2

(12) United States Patent (10) Patent No.: US 8,904,028 B2
Iannaccone et al. (45) Date of Patent: Dec. 2, 2014

(54) SCALABLE CLUSTER ROUTER

(75) Inventors: Gianluca Iannaccone, Berkeley, CA (US); Sylvia Ratnasamy, Berkeley, CA (US); Maziar Manesh, Kensington, CA (US); Katerina Argyraki, Lausanne (CH); Byung-Gon Chun, Albany, CA (US); Kevin Fall, Berkeley, CA (US); Allan Knies, San Francisco, CA (US); Norbert Egi, Somberek (HU); Mihai Dobrescu, Lausanne (CH); Salman Baset, New York, NY (US)

(73) Assignee: Intel Corporation, Santa Clara, CA (US)

( * ) Notice: Subject to any disclaimer, the term of this patent is extended or adjusted under 35 U.S.C. 154(b) by 629 days.

(21) Appl. No.: 12/838,785

(22) Filed: Jul. 19, 2010

(65) Prior Publication Data

US 2011/0016223 A1 Jan. 20, 2011

Related U.S. Application Data

(60) Provisional application No. 61/271,186, filed on Jul. 17, 2009.

(51) Int. Cl.
*G06F 15/16* (2006.01)
*G06F 15/173* (2006.01)
*H04L 12/773* (2013.01)
*H04L 12/803* (2013.01)
*H04L 12/701* (2013.01)
*H04L 12/931* (2013.01)
*H04L 12/775* (2013.01)
*H04L 12/729* (2013.01)

(52) U.S. Cl.
CPC .............. *H04L 45/60* (2013.01); *H04L 47/125* (2013.01); *H04L 45/00* (2013.01); *H04L 45/583* (2013.01); *H04L 45/125* (2013.01); *H04L 49/45* (2013.01)
USPC ........................... 709/232; 709/238; 709/243

(58) Field of Classification Search
USPC .......... 709/230–235; 370/229–238, 351, 389, 370/400, 412–418
See application file for complete search history.

(56) References Cited

U.S. PATENT DOCUMENTS

| | | | | |
|---|---|---|---|---|
| 6,801,949 | B1 * | 10/2004 | Bruck et al. ................... | 709/232 |
| 2002/0194345 | A1 * | 12/2002 | Lu et al. ........................ | 709/227 |
| 2003/0210686 | A1 * | 11/2003 | Terrell et al. .................. | 370/389 |
| 2005/0108425 | A1 * | 5/2005 | Rabinovitch ................... | 709/238 |
| 2006/0109853 | A1 * | 5/2006 | Matsuzawa et al. .......... | 370/400 |
| 2006/0182035 | A1 * | 8/2006 | Vasseur ......................... | 370/238 |
| 2007/0121499 | A1 * | 5/2007 | Pal et al. ....................... | 370/230 |
| 2008/0253398 | A1 * | 10/2008 | Calvignac et al. ............. | 370/474 |
| 2009/0217369 | A1 * | 8/2009 | Abeni et al. .................... | 726/13 |

OTHER PUBLICATIONS

Ye, et al., "Cluster-based IP Router: Implementation and Evaluation", IEEE International Conference on Cluster Computing, Barcelona Sep. 25-28, 2006; available at webdocs.cs.ualberta.ca-~qinghua/cluster_06_ye.pdf; retrieved on Mar. 1, 2011.

* cited by examiner

*Primary Examiner* — Shirley Zhang
(74) *Attorney, Agent, or Firm* — Grossman, Tucker, Perreault & Pfleger, PLLC

(57) ABSTRACT

Generally, this disclosure describes a scalable cluster router that includes a plurality of server-class computers interconnected together to form a router. Each server may be configured to independently schedule switching of packets to reduce the switch speed requirements on a per server basis. Each server may include a scheduler that independently load balances packet flows across servers of the cluster. Router capacity may be incrementally scaled by adding more servers, and router capacity may be increased by load balancing techniques within individual servers.

27 Claims, 5 Drawing Sheets

SCALABLE CLUSTER ROUTER

This application claims priority to Provisional Application Ser. No. 61/271,186, filed Jul. 17, 2009, which is hereby incorporated by reference in its entirety.

FIELD

The disclosure relates to a scalable cluster router and, more particularly, to a server-based scalable cluster router that includes load balancing of packet flows across the servers in the cluster.

BACKGROUND

The development of network equipment, e.g., switches and routers, has typically focused primarily on achieving high performance for relatively limited forms of packet processing. However, as networks have taken on increasingly sophisticated functionality (e.g., data loss protection, application acceleration, intrusion detection), and as major ISPs compete in offering new services (e.g., video, mobility support services), there is interest in network equipment that is programmable and extensible. In the absence of such extensibility, network providers have typically incorporated new functionality by deploying special-purpose network "appliances" or middleboxes. However, as the cost of deploying, powering, and managing this assortment of boxes grows, the vision of a consolidated solution in the form of an extensible packet processing "router" has grown more attractive.

In existing networking equipment, high performance and programmability are often competing, and possibly mutually exclusive, goals. On the one hand, high-end routers, because they rely on specialized and closed hardware and software, are difficult to extend, program, or otherwise experiment with. In order for a hardware router to avoid becoming a bottleneck, the hardware router must switch at speeds of M*R, where M is the number of router ports and R is the line speed on the router ports (e.g., 1, 10, 40 Gbps, or greater). To do so, dedicated, special purpose hardware is required that does not lend itself to scalability or programmability. On the other hand, "software routers" perform packet processing in software running on general-purpose platforms and are easily programmable, but have so far been suitable only for low packet rate environments and for a limited number of router ports. A single server software router using existing server technology, although it may be programmable, is unable to achieve hardware router speeds.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes a scalable cluster router/switch that utilizes a plurality of general purpose servers. The servers include external ports (router ports) to connect to the network (or network device) and internal ports to connect the servers together to form a cluster router. Each server is configured to provide a switching speed cR, where c is independent of the number of servers (N) and the number of router ports (M), and where c is typically much smaller than M. Each server includes a scheduler to independently schedule switching and routing among the servers in the cluster. The scheduler is also configured to switch packets directly from an input server to an output server, if conditions permit, or to load balance incoming packet flows to other servers in the cluster, using random port assignments and/or quasi-random port assignments. In some embodiments, the scheduler is configured to load balance packet flows, while reducing or eliminating the need for processing on subsequent servers to reorder packets. Advantageously, the scheduler eliminates the need for centralized switching and its associated processing requirement that is typically on the order of M*R, thus allowing the use lower speed server platforms. Thus, by clustering a plurality of servers and providing for scheduled load balancing may eliminate the need for dedicated hardware routing solutions. In addition, router capacity may be incrementally scaled by adding more servers and/or using load balancing techniques within individual servers (e.g. multi-core architectures), without requiring additional processing capabilities for the servers.

System Architecture and Methodology

Figure 1:
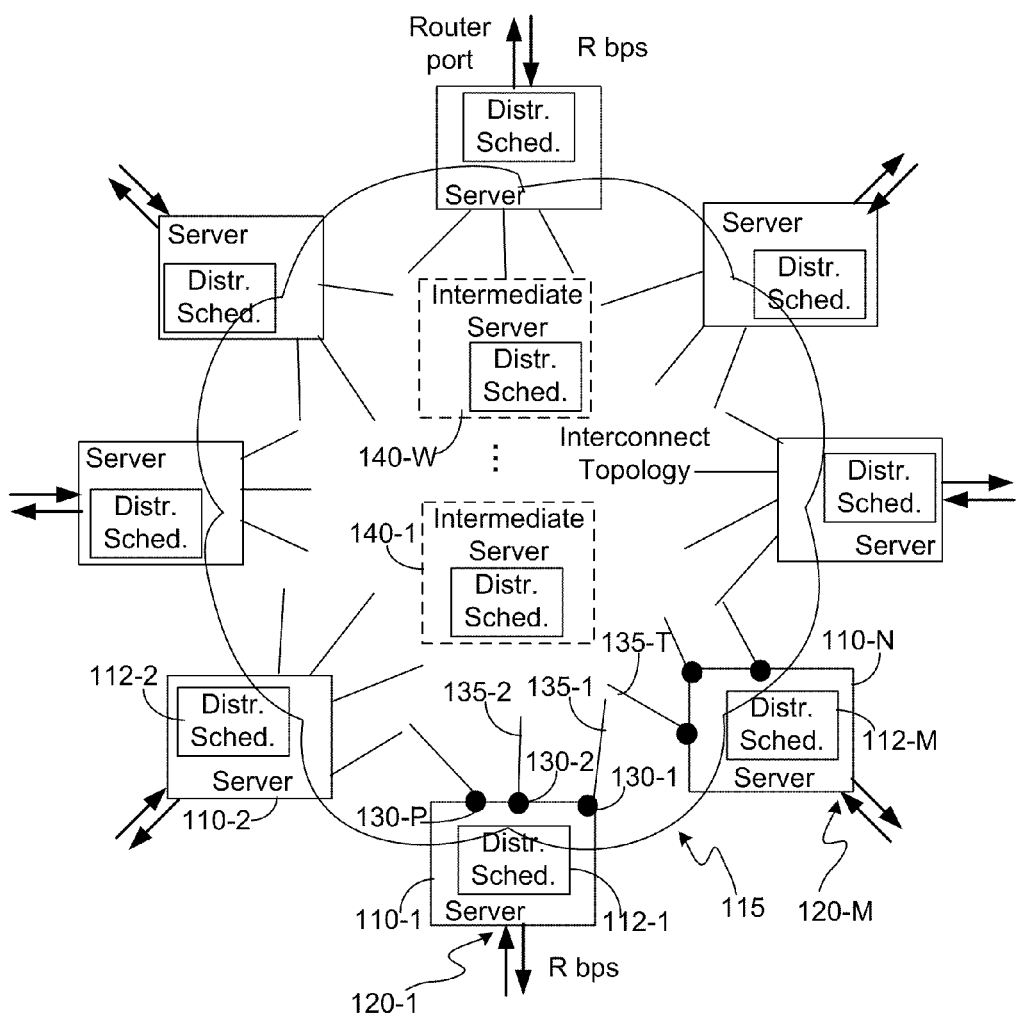
FIG. 1 illustrates one example of a scalable cluster router consistent with the present disclosure.

FIG. 1 illustrates an example of a scalable cluster router/switch 100 consistent with the present disclosure. The router 100 includes a plurality of servers clustered together in an interconnect topology 115. The plurality of servers includes N node servers 110-1, . . . ,110-N ("server") and may include one or more intermediate servers 140-1, . . . ,140-W. Each node server 110-1, . . . ,110-N is configured to receive network data (e.g., packets) on an associated router port (at line rate R bps) and to process the received packets to determine a destination. Packet processing may include, e.g., route lookup, classification, and/or other known packet processing functions.

Each node server 110-1, . . . ,110-N may include at least one I/O port configured as an associated external port 120-1, . . . ,120-M. Each associated external port 120-1, . . . ,120-M is configured to transmit and/or receive network data at up to the maximum line rate R bps. Current line rates are typically on the order of 1 Gbps, 2.5 Gbps, 10 Gbps or greater. The external ports generally operate to transmit/receive data to/from a network (or a network device) external to the cluster 100. An external port may be referred to herein as a router port, where the total number of router ports in the cluster is designated herein as M. In some configurations, the number of router ports, M, may equal the number of node servers N, i.e., each node server includes one associated external port. In other configurations, the number of router ports, M, may exceed the number of node servers N, i.e., at least one node server includes more than one associated external port. Whether a node server includes a plurality of associated external ports depends, at least in part, on router port maximum line rate R and the processing capacity of the node server. For example, based at least in part on the line rate, R, a node server may have sufficient processing capacity, e.g., processing speed, to support more than one external port 110-1, . . . ,110-N.

Each node server 110-1, . . . ,110-N may include a plurality of I/O ports configured as associated internal ports 130-1, . . . ,130-P. Each associated internal port 130-1, . . . ,130-P is configured to couple a node server, e.g., node server 110-1, to each other node server, e.g., node servers 110-2, . . . ,110-N, via a subset of a plurality of internal links 135-1, . . . ,135-T. The line rate of each internal link depends on the maximum line rate R of each external port and the number node servers N. For example, in an N server cluster router where each node server is directly coupled to all other node servers, and each server has one associated external port (i.e., N=M), each node server would therefore include N−1 associated internal ports.

The interconnect topology 115 may take several forms. In one configuration, each node server 110-1, . . . ,110-N is directly connected to each other node server 110-1, . . . ,110-N in a full mesh topology. As used herein, "directly connected" means without being coupled through an intermediate server. In another configuration, a multihop network topology may be used when the number N of node servers 110-1, . . . ,110-N exceeds the number of internal ports 130-1, . . . ,130-P of each node server. In this case, one or more intermediate servers 140-1, . . . ,140-W may be used as intermediate connections between node servers. Each intermediate server 140-1, . . . ,140-W may include a plurality of I/O ports configured as internal ports. When intermediate servers are used, a total number of servers (node servers plus intermediate servers) may be greater than M, the number of router ports. In one example, the multihop network topology may be a butterfly network, e.g., a k-ary n-fly butterfly network where k corresponds to a number of internal ports of each intermediate server 140-1, . . . 140-W, n corresponds to a number of stages of intermediate servers, $n=\log_k N$ and $k^{n-1}$ corresponds to a number of intermediate servers per stage. Of course, other known multihop network topologies may be used, e.g., d-dimension torus, debruijn, etc.

Each server may also include one or more processors, memory and one or more network interfaces (not shown in this figure) to enable each server to send and receive network data to and from a network (or network device, not shown) via external ports, process network data, and to enable each server to communicate with one another, via internal ports, in the clustered environment. Each server may also include send/receive queues for each internal port and send/receive queues for each external port. In operation, each server is configured to receive network data from either a router port or an internal port, process the network data to determine an output router port (by, for example, parsing a packet header), and forward the network data to the output node server that includes the output router port for egress to the network (or network device).

Each server may include a scheduler 112 configured to switch packets from an external port to an internal port, or from one internal port to another internal port, by selecting an internal port in a load balanced manner. In a conventional hardware router with M external ports operating at a link speed of R, the hardware router is required to have a switching speed of M*R in order to ensure that ingress and egress of packets occurs at around R speed (for M ports). In contrast, according to the teachings of the present disclosure, processing and switching may be distributed among the members of the server cluster 100. Thus, instead of requiring any one server to be capable of switching at a speed of M*R, the M*R aggregate speed is achieved with servers each capable of switching at cSR, where c is typically small compared to M and is independent of M, as will be described in greater detail below.

An M-port scalable cluster router 100 with line rate R and N node servers, consistent with the present disclosure, is configured to distribute the switching load across the N node servers. To that end, scheduler 112 is configured to determine which internal port will be used to route the network data to either the output node server or another server (node server or intermediate server). In one example, scheduler 112 may be configured to randomly select an internal port to forward the packet flow to a random server, regardless of the queue state (or flow status) of the selected internal port. Since the destination port for a given packet flow may be known, scheduler 112 may be configured to first check the input port that is coupled to the output node server so that the packet flow is routed directly from the input node server to the output node server. While the shortest path is usually found directly between the input node server and the output node server, if the queue associated with the internal port, that is linked to the output node server, is full (or exceeds a threshold), scheduler 112 may be configured to randomly select another internal port, and forward at least some of the packets in a given flow to another server, thus balancing the load for a given packet flow to at least one other server. For certain packet flows, depending on the load conditions at a particular input node server, each server may be configured to split a given flow into a plurality packet groups and scheduler 112 may be configured to select an internal port for each packet group, as described above.

Thus, the network data (e.g., packet flow) may be sent to another server before reaching the output node server. If another server is selected, that other server may be configured to determine network data is being received on an internal port and to forward the network data to the output node server directly, or to another server (for example if an intermediate server is used). Alternatively, to avoid additional packet processing at subsequent servers, each server may be configured to modify a MAC address associated with the network data to permit a subsequent server to forward that network data to an output node server without processing the packets to determine a destination. The operations of scheduler 112 are described in greater detail below.

Figure 2A:
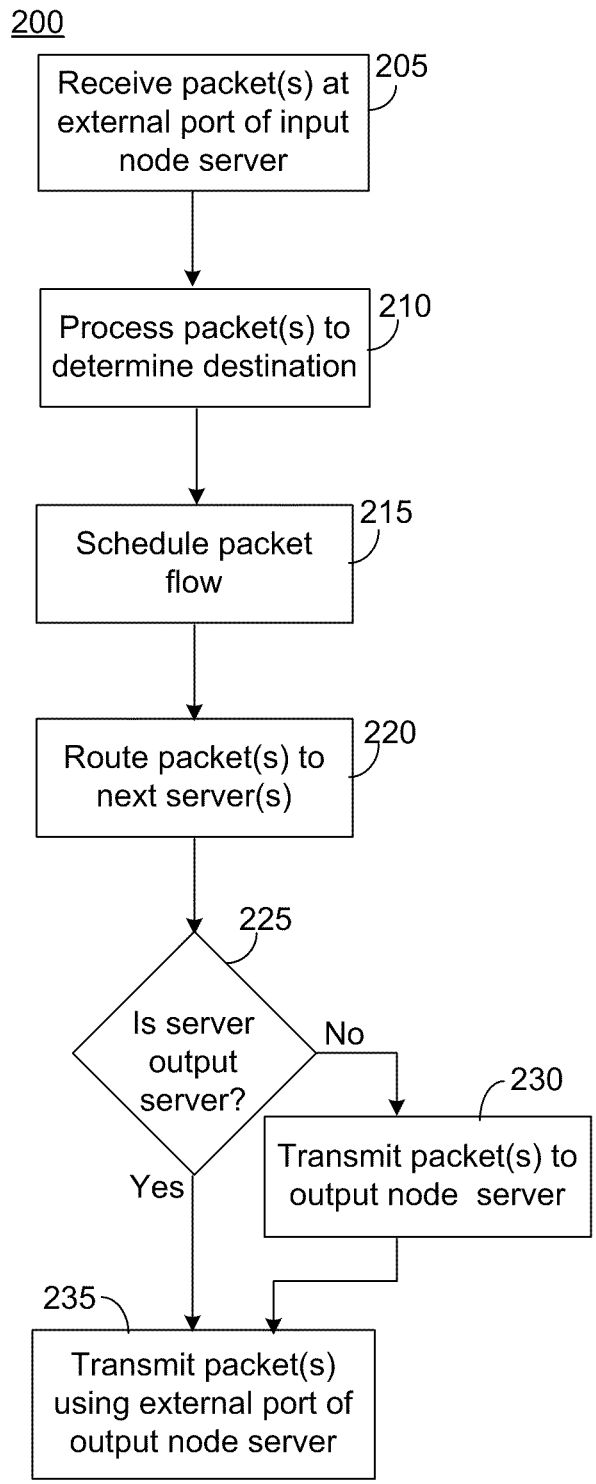
FIG. 2A depicts a flow chart of example operations of a scheduler according to one embodiment consistent with the present disclosure.

FIG. 2A depicts a flow chart 200 of example operations of the scheduler 112 consistent with the present disclosure. At operation 205, one or more packet(s) may be received at an associated external port of a node server ("input node server"). Packet(s) may be received at a line rate of R bps supported by the external port. Operation 210 may include processing the received packet(s) to determine a destination. Once the destination has been determined, the received packet(s) may be scheduled to be forwarded to a next server or servers, via a scheduler (e.g., scheduler 112), at operation 215. As described herein, scheduler 112 may be configured to schedule packet flow to one or more servers to balance the processing and traffic load among the servers in the cluster.

Selecting the next server or servers based only on a packet flow identifier (e.g., source/destination IP and/or port number) may avoid reordering but may result in load imbalance. To load balance received packet flows to some or all of the servers in the cluster, scheduler 112 may be configured to route (switch) packets to one or more randomly selected servers. In one embodiment, in a full mesh topology, scheduler 112 may be configured to load balance using a Valiant load balancing ("VLB") scheme. In VLB, incoming packets may be split and sent randomly to one or more other servers before arriving at an output node server. VLB routing may occur in two phases. A packet may enter the router at a first node server ("input node server") and may be configured to exit at a second node server ("output node server"). Rather than being routed directly from the input node server to the output node server, the packet may be routed to a third server, selected randomly or sequentially, then from the third node server to the output node server. Routing from the input node server to the third node server corresponds to "phase 1". Routing from the third node server to the output node server corresponds to "phase 2". Note that the output node server may be randomly selected during phase 1, thus phase 2 would be unnecessary. In this way, a sequence of packets that enters at the input node server and exits at the output node server is first load balanced from the input node server across some or all of the servers, then reassembled at the output node server and transmitted out of the cluster via the output port.

The operations of phase-1 may be configured to randomize the original input traffic such that the traffic each server receives at the end of phase-1 (i.e., the input traffic to phase-2) is roughly a uniform sample of the overall input traffic to the router at phase-1. As a result, when a server handles phase-2 traffic, it may make local switching decisions about which packets to drop and which to forward to each output port. This technique may provide 100% throughput and fairness without centralized switching. Because VLB is configured to split traffic uniformly across the scalable cluster router's internal links, in a full-mesh interconnect topology of N node servers with a per-port line rate of R bps, each internal link may advantageously operate at lower link speeds, for example a link speed of 2R/N.

In the full mesh interconnect topology, using VLB, packets may be forwarded twice (or more if an intermediate node server is used). If packet flow is sent directly to the output node server from the input node server, the a cluster router may handle traffic at a rate of 2R, e.g., R coming in from the node server's associated external port (to be sent to the other servers) plus R arriving from the other servers to be sent out on the node server's associated external port. With VLB, each node server receives an additional R of incoming traffic because of the load balancing, and therefore each server may be configured to switch at a rate of 3R.

"Direct VLB", a variant of VLB, may reduce VLB overhead as follows. Phase-1 in VLB is configured to randomize traffic across the servers. When the cluster's traffic load is close to uniform across the servers (as may be the case), this first phase may be mostly avoided. To that end, each server may be configured to determine the relative traffic in each input port receive queue. If the input port receive queues are experiencing roughly the same packet flow rate, this may be indicate that all of the servers in the cluster are experiencing approximately the same traffic load. In this case, phase 1 may be skipped and the traffic may be routed directly to the output node server. Without violating the throughput and fairness (packets are dropped in a balanced manner) constraints that may be required of a router, when the cluster's traffic matrix is close to uniform, each server may be advantageously switch at lower speeds, for example a speed of about 2R. Using VLB or direct VLB, each server's switching speed may then be cR where c is between 2 and 3, inclusive.

At operation 220, the received packet(s) may be routed to a next server or servers, in accordance with the load balancing operations described above. After the next server has been determined, and the packet has been routed to the next server, program flow may proceed to operation 225. Operation 225 may include determining whether the next server is an output node server. If the next server is not the output node server, the packet(s) may be transmitted to the output node server at operation 230. Alternatively, packets may be forwarded to another server, e.g., forwarded to a node server from an intermediate server. To that end, as described above, each server may be configured to determine if traffic is received on an internal port, and if so, determine the output node server, forward the traffic to the output node server (via its own internal port) to enable egress of the packet flow out to the network. If the next server is the output node server, packets may be transmitting using an associated external port of the output node server 235. For example, the output node server may process packet header information to determine a destination. Alternatively, the input node server may be configured to process the packet header information to determine the destination, and in order to avoid subsequent servers to avoid additional packet header processing, the input node server may be configured to encode an identity in the packet's MAC address to that subsequent servers can determine the destination based on the queue assignment of the incoming packet.

Figure 2B:
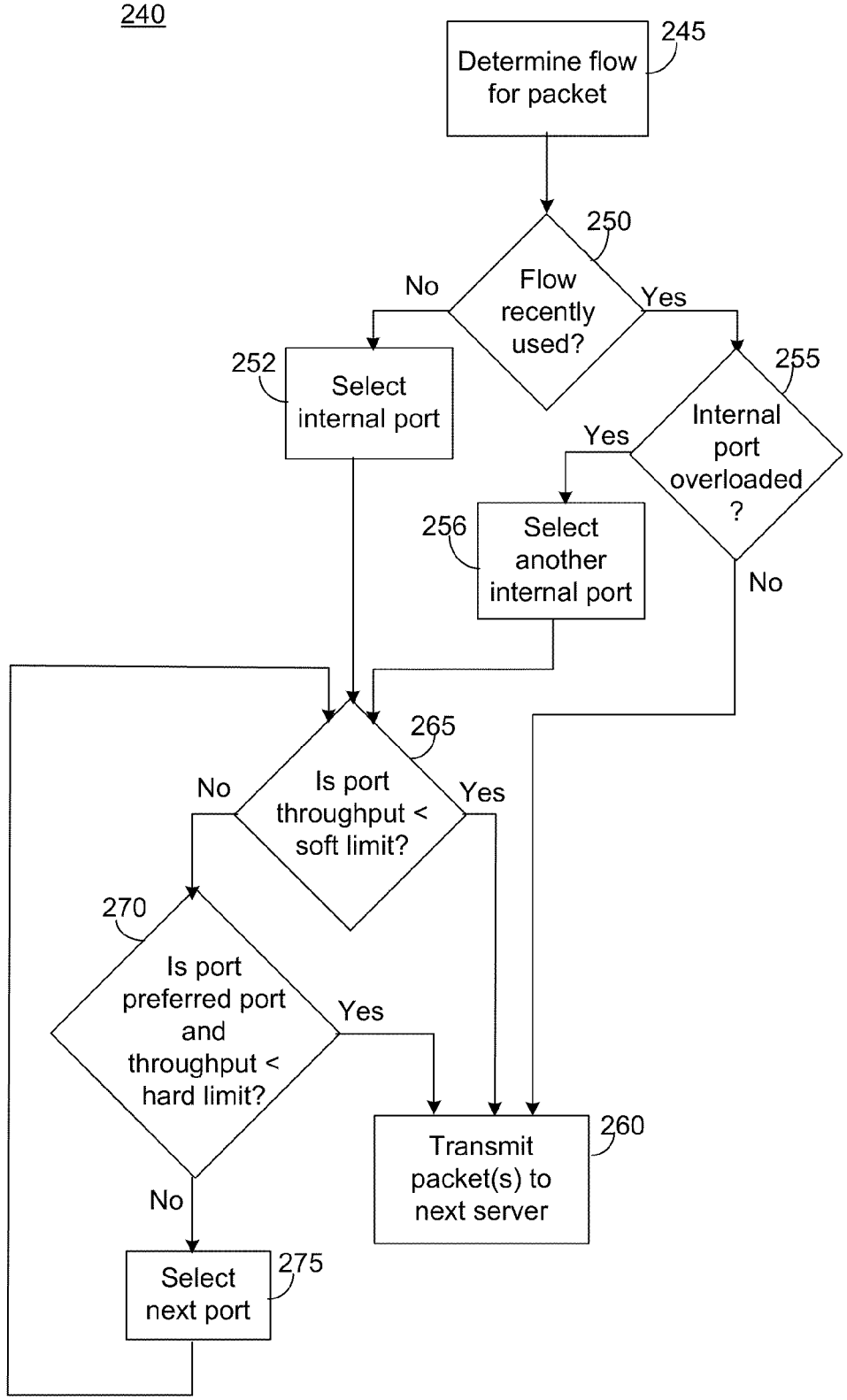
FIG. 2B depicts a flow chart of example operations of a scheduler according to another embodiment consistent with the present disclosure.

While the foregoing description of VLB and direct VLB may balance the load across the servers of the router, there may be circumstances when load balancing causes packets to arrive at the output node server out of order, thus requiring the output node server to reorder the packets. FIG. 2B depicts an example flow chart 240 of a scheduler according to another embodiment consistent with the present disclosure. In this embodiment, scheduler 112 may be configured to provide load balancing while reducing or eliminating reordering of packets at the output node server. Operation 245 may include determining a flow for a received packet. Packets may arrive in a "flow," for example, packets arriving from the same source and destined to the same destination. Packet flow may be determined based on a flow identifier, as may be specified in a packet header. Operation 250 may include determining whether the identified flow was recently processed by the server. In other words, whether packets from the identified flow were recently received, may be determined. Here, "recently" may be defined as a time interval between the last packet and the newest packet, and such a time interval may be fixed (e.g., programmable), random or within a certain programmable range. If packet in the identified flow was recently received by the input node server, whether the internal port associated with the identified flow is overloaded may be determined at operation 255. "Overloaded" may be understood as exceeding a transmission capacity constraint of an internal port, for example, a full queue or a queue that has exceeded a threshold or by determining a throughput rate at a given port. If the internal port is not overloaded, the packet may be transmitted to the next server at operation 260. Thus, based on a packet flow identifier, relatively short bursts of packets from the same packet flow may be sent to a same next server using the same internal port. If the internal port is overloaded, another internal port may be selected 256, for example using the aforementioned VLB and/or direct VLB load balancing techniques described above. If the packet flow has not been recently received (250), another internal port may be selected 252, for example using the aforementioned VLB and/or direct VLB load balancing techniques described above.

If another internal port is selected (252 or 256), whether throughput (load) on a selected internal port is below a soft limit may be determined at operation 265. A "soft limit" may include a threshold that can be exceeded by a predetermined amount or percentage. For example, a threshold may be applied to queue capacity of a queue associated with an internal port, where if the capacity is within a certain range (or percentage) of the threshold, that queue may accept additional packets. If throughput is below the soft limit, the packet may be transmitted to the next server on the selected internal port at operation 260. If the throughput on the selected internal port is not below the soft limit, whether the selected port is a preferred port and the throughput is below a hard limit may be determined at operation 270. A "preferred port" may include the internal port used by the last packet of the same identified flow, but not used by that flow within the time limit specified at operation 250. A "hard limit" may include, for example, a queue capacity threshold that may not be exceeded. If the selected port is a preferred port and the throughput is below a hard limit, the packets may be transmitted to the next server on the selected port at operation 260. If the selected port is not a preferred port or the throughput is above the hard limit, a next internal port may be selected at operation 275, for example using the aforementioned VLB and/or direct VLB load balancing techniques described above.

In this manner, distributed switching, that considers local "bursts" of packets in a packet flow, may provide load balanced routing while avoiding packet reordering in a scalable cluster router, e.g., router 100. In other words, load balancing is modified based on "bursts" of packets from the same packet flow. Using the scheduler as described herein, switching speed requirements of each node server may be advantageously limited to at most 3R. In addition, since the scheduler does not require information from other servers to achieve load balancing (i.e., the scheduler selects ports independently of other servers), the present disclosure avoids unnecessary communication overhead between servers.

To reduce output port determination overhead in subsequent servers, each server may be configured may move the packet(s) from a receive queue to a transmit queue without processing the packet header. To that end, the servers may include network adapters that are configured to assign packets to receive queues based on their MAC addresses. In particular, when a packet arrives at the input node server, a processor in the input node server may process the packet's header and encode an identity of an output node server in the packet's MAC address. For example, the input node server may set a source MAC address to an external port of the output node server and a destination MAC address to an internal port of the next server. At each subsequent server, the packet is stored in a receive queue based on its MAC address. Accordingly, each subsequent server may determine where to send the packet based on the receive queue in which the packet(s) are stored. In other words, a subsequent server may deduce a packet's MAC address, and from the MAC address, an appropriate output node server, by determining the receive queue where the packet is stored. In this example, it may be assumed that each internal port of a server has as many receive queues as there are router ports.

In some embodiments, a node server may be configured with more than one external port. If a number of associated external ports per node server is s and the maximum external port line rate (i.e., router port line rate) is R bps, and assuming a full mesh interconnect topology with load balancing, as described herein, then a node server switching speed may be $c*s*R$ bps. The interconnect topology may then include $N-1=M/s-1$ internal links, with an internal link speed of $2sR/N$. An M-port programmable scalable cluster router may then include $N=M/s$ node servers rather than $N=M$ node servers. Advantageously, an M-port programmable scalable cluster router, with a line rate R bps per router port may include fewer, more powerful (i.e., greater processing capacity) node servers than an M-port programmable scalable cluster router, with the same per port line rate, configured with relatively less powerful node servers. In other words, as processing capacity of each node server increases, the number of node servers may decrease while maintaining the number and speed of the router ports generally constant.

The foregoing description of FIGS. 1, 2A and 2B provide cluster load balancing using scheduler that can execute independently of other servers in the cluster, and can offer reduced switching requirements on a per server basis. Each node server may be a general purpose computer server, which may include, for example, off-the-shelf components that are relatively inexpensive, as compared to dedicated hardware router solutions. The number of servers, interconnect topology and throughput may depend on server architecture. For example, whether intermediate servers are included may depend on the number of internal ports available in each node server. Certain server topologies may be used to take advantage of additional load balancing techniques so that overall throughput of the server cluster is enhanced. Exemplary server architectures are described below.

Exemplary Server Architecture

Figure 3:
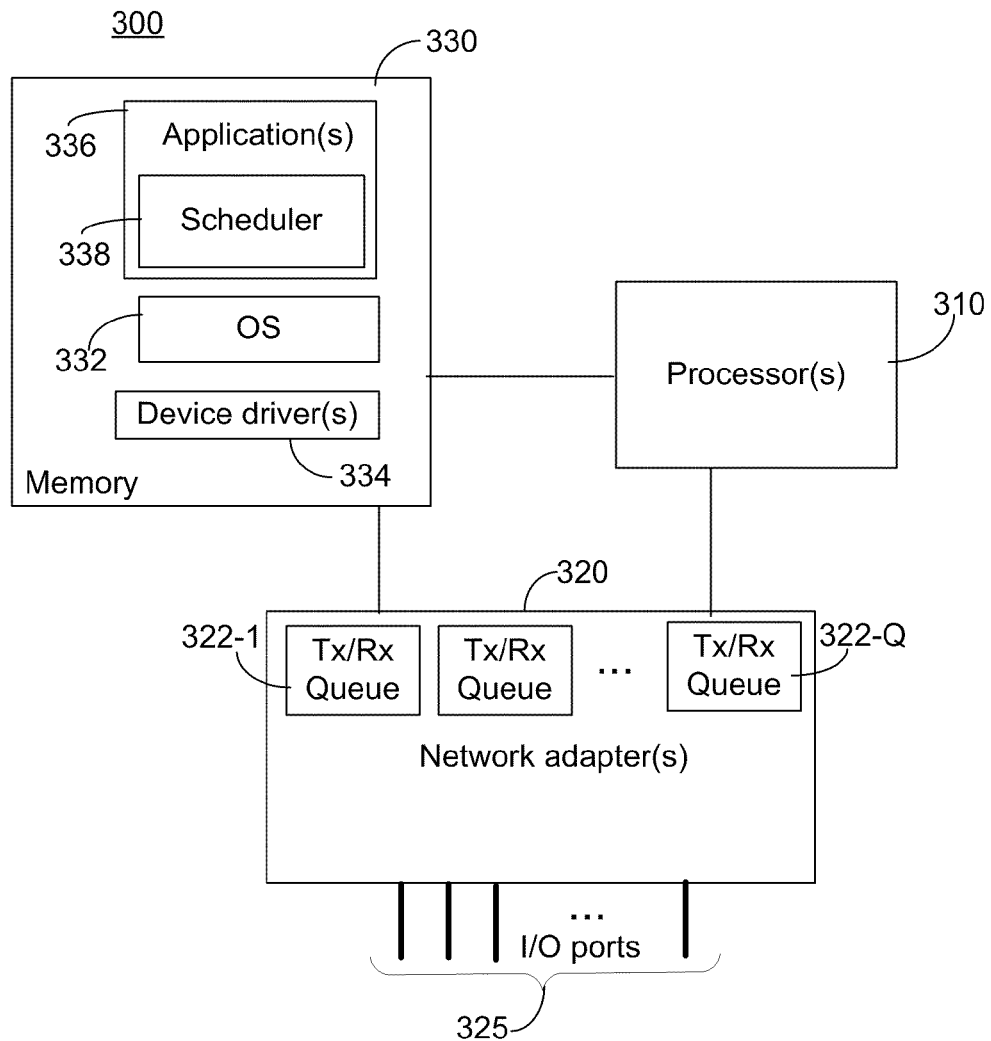
FIG. 3 is a functional block diagram of a server architecture consistent with the present disclosure.

FIG. 3 is a functional block diagram of one exemplary server 300. As will be appreciated by those skilled in the art, other components of a commodity server-class computer have been omitted, e.g., bus structures, and other storage, including disk drive(s), for ease of description. The server 300 includes one or more processors 310, one or more network adapters 320 and memory 330. The memory 330 may include an operating system ("OS") 332, one or more device driver(s) 334 and one or more application(s) 336. For example, scheduler 112 may comprise code consistent with the forgoing description, and reside in memory 330. In this case, one or more processors 310 may execute scheduler 112 to provide load balancing, as described herein.

The network adapter(s) 320 include a plurality of ports 325. Each of the plurality of ports 325 may be configured as an internal port or an external port, as described herein. Each external port may be configured to operate at a line rate of R bps, which may be the maximum line rate of a router port. A node server may be configured with at least one external port and a plurality of internal ports. An intermediate server may be configured with a plurality of internal ports, i.e., without external ports. The network adapter(s) may include a plurality of transmit and/or receive queues, e.g., Tx/Rx Queues 322-1, . . . ,322-Q, configured to queue network data, as described herein.

Processor 310 may include a multi-core processor architecture. In such an embodiment, server 300 may be configured to utilize Receive Side Scaling (RSS) to select the core for packet processing. RSS can distribute incoming packets across multiple processors in a system. RSS is a Microsoft® Windows® operating system ("OS") technology that enables receive-processing to scale with the number of available computer processors by allowing the network load from a network adapter to be balanced across multiple processors. RSS is described in "Scalable Networking: Eliminating the Receive Processing Bottleneck—Introducing RSS", WinHEC (Windows Hardware Engineering Conference) 2004, Apr. 14, 2004 (hereinafter "the WinHEC Apr. 14, 2004 white paper").

In another embodiment, in a server with network adapters configured with a plurality of receive queues, so-called "application targeted routing" (ATR) can be used to assign packet processing to a specific MAC receive queue and processor core pair. Once the queue/core pair is assigned, ATR logic (residing in the MAC) can be used to track TCP/IP and/or UDP packet flows and post packets to the correct queue/core pair. Using ATR, each received packet may be handled by one core and each queue may be accessed by one core. Accordingly, ATR may be used to increase throughput and to avoid interprocess locks.

Figure 4:
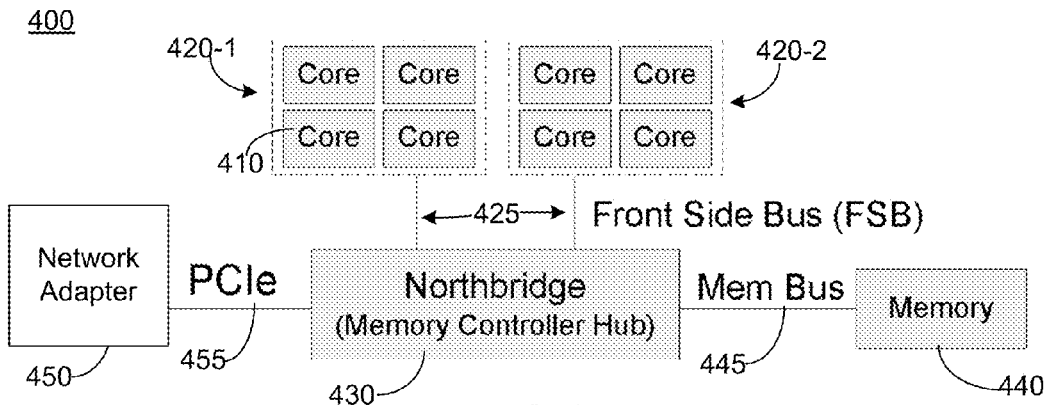
FIG. 4 is an example of a shared bus architecture server consistent with the present disclosure.

As described above, server processing capacity depends, at least in part, on server architecture. FIG. 4 is an example of a shared bus architecture server 400. The shared bus server 400 includes a plurality of cores (i.e., processors) 410 arranged in one or more socket(s) 420. For example, shared bus server 400 includes two sockets 420 and each socket includes four cores 410. A shared bus server may include more or fewer sockets and more or fewer cores per socket, as will be understood by those skilled in the art. Each socket 420-1, 420-2 is coupled to a memory controller hub 430 by a front side bus 425. The memory controller hub 430 is coupled to a memory 440 by a memory bus 445. The memory controller hub 430 may be coupled to one or more network adapter(s) 450 by a bus, e.g., PCIe bus 455. PCIe bus protocol may comply or be compatible with the PCI express 2.0 standard published by the Peripheral Component Interconnect Special Interest Group (PCI-SIG) title "PCI Express 2.0 Specification", published January, 2007 and/or later versions of this standard. In the shared bus architecture 400, communication between sockets 420-1, 420-2, memory 440 and I/0 devices, e.g., Network Adapter 450, is routed over the shared front-side bus 425. Further, the shared bus architecture uses a single external memory controller 430.

The shared bus architecture server 400 may have an associated processing capacity. The associated processing capacity depends, at least in part, on the architecture of the server 400 and speeds of individual components in the architecture, e.g., the core(s), the memory bus, the front side bus and the PCIe link. For example, assuming (ideally) 100% efficiency in bus usage, full exploitation of the plurality of cores and no OS overhead, a line rate of R bps yields loads of 4R on the memory bus, 2R on the front side bus and 2R on the PCIe bus. In this example, the memory bus may provide an upper limit on processing capacity of the shared bus architecture.

Figure 5:
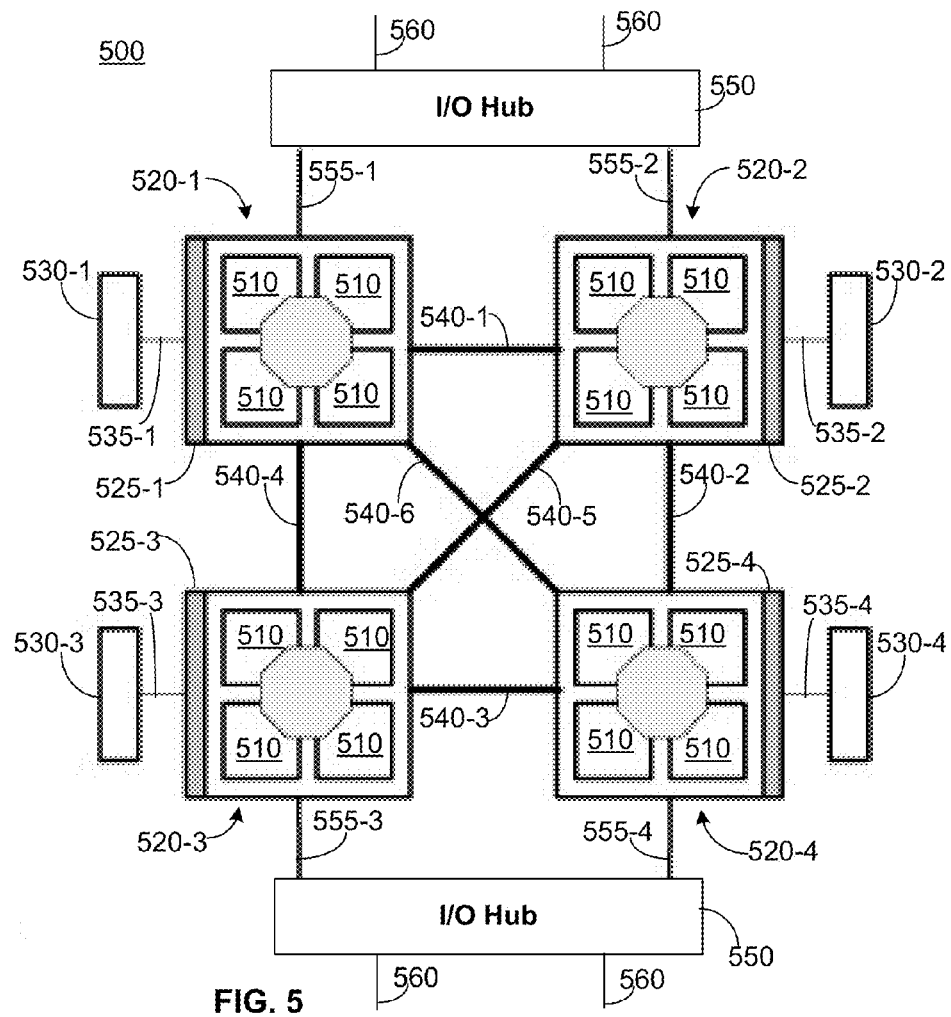
FIG. 5 is an example of a non-uniform memory access ("NUMA") architecture server consistent with the present disclosure.

FIG. 5 is an example of a non-uniform memory access ("NUMA") architecture server 500. The NUMA server 500 includes a plurality of cores (i.e., processors) 510 arranged in a plurality of sockets. For example, NUMA server 500 includes four sockets 520-1, . . . ,520-4 and each socket includes four cores 510. A NUMA server may include more or fewer sockets and more or fewer cores per socket, as will be understood by those skilled in the art.

Each socket 520-1, . . . ,520-4 includes a respective integrated memory controller 525-1, . . . , 525-4, coupled to a respective memory 530-1, . . . , 530-4 by a respective memory bus 535-1, . . . , 535-4. The sockets 520-1, . . . , 520-4 are coupled to each other by inter-socket links 540-1, . . . ,540-6. Each socket 520-1, . . . , 520-4 is coupled to an I/O hub 550 by a respective socket-IO link 555-1, . . . , 555-4. The I/O hub 550 may be coupled to one or more network adapter(s), e.g., network adapter(s) 320, by, e.g., PCIe buses 560. In the NUMA architecture 500, communication happens over a mesh of dedicated point-to-point links. Further, the integrated memory controller 525-1, . . . , 525-4 and dedicated memory bus 535-1, . . . , 535-4 included in each socket 520-1, . . . , 520-4, may result in an aggregate increase in memory bandwidth as compared to the shared bus architecture server 400.

The NUMA architecture server 500 may have an associated processing capacity. The associated processing capacity depends, at least in part, on the architecture of the server 500 and speeds of individual components in the architecture, e.g., the core(s), the memory buses, inter-socket links and PCIe links. For example, assuming (ideally) 100% efficiency in bus usage, full exploitation of the plurality of cores and no OS overhead, a line rate of R bps yields loads of R on each memory bus, 2R/3 on each inter-socket link and R/2 on each PCIe bus. Accordingly, a NUMA architecture server may accommodate a faster line rate than a shared bus architecture.

Accordingly, a shared bus architecture server, e.g., shared bus architecture server 400, may be adequate for node servers in scalable cluster routers with relatively lower line rate router ports. A NUMA architecture server, e.g., NUMA architecture server 500, may be used for node servers in scalable cluster routers with relatively higher line rate router ports. It is contemplated that as servers evolve, e.g., as processing capacity increases, that a scalable cluster router consistent with the present disclosure may be capable of routing even higher line rate network traffic.

Thus, multi-core topologies described herein may therefore be used to load balance packet flows across the cores in the server. Server processing capacity may depend not only on interconnects within a server architecture but also on processor (e.g., core) processing capacity. The number of processor cycles available for packet processing may depend on line rate, packet size and core speed. Accordingly, faster processors may process more packets and may therefore support a higher line rate R, and may also operate to factor out bottlenecks which may be present in other components (e.g., buses). In other embodiments, multiple instances of the scheduler 112 may be included, for example, so that each core can execute its own scheduler 112. In such an embodiment, each core may be configured load balance packet flows independently of the other cores in the server, and at the cluster level, independently of other servers in the cluster.

While the foregoing includes many exemplary architectures and methodologies, modifications to the present disclosure are possible. For example, operating system 332 may manage system resources and control tasks that are run on server 300. For example, OS 332 may be implemented using Microsoft Windows, HP-UX, Linux, or UNIX, although other operating systems may be used. Operating system 332 may implement one or more protocol stacks (not shown). A protocol stack may execute one or more programs to process packets. An example of a protocol stack is a TCP/IP (Transport Control Protocol/Internet Protocol) protocol stack including one or more programs for handling (e.g., processing or generating) packets to transmit and/or receive over a network. A protocol stack may alternatively be comprised on a dedicated sub-system such as, for example, a TCP offload engine.

The server router described herein may be configured to communicate using an Ethernet communications capable of permitting communication using a Transmission Control Protocol/Internet Protocol (TCP/IP), User Datagram Protocol (UDP), and/or other communications protocols. The Ethernet protocol may comply or be compatible with the Ethernet standard published by the Institute of Electrical and Electronics Engineers (IEEE) titled "IEEE 802.3 Standard", published in March, 2002 and/or later versions of this standard.

The foregoing detailed description has used the terms switch and router interchangeably in the sense that each server is configured receive packets and, ultimately, determine an output node to transmit the packets out of the server cluster. A switch may be understood to control packet flow between devices on the same network (e.g., moving packets within the server cluster) using, e.g., MAC address information. A switch may operate at layer 2 of the OSI Model. A router may be understood as determining where to send a packet, based on, e.g., the network ID within the network layer header of a packet. A router may operate at layer 3 of the OSI Model. Thus, the functions of the scheduler 112, as described herein, may be configured to operate at the data link layer (layer 2). Layer 2 may include a logical link control (LLC) sublayer, in which scheduler 112 may be configured to establish and control of logical links between servers in the cluster, and/or a media access control (MAC) sublayer, in which scheduler 112 may be configured to e.g., control access to the links between servers in the cluster. In addition, the functions of the scheduler 112 as described herein, may be configured to operate at a network layer (layer 3) to control, for example, addressing and routing.

The scheduler 112 may be implemented in software (e.g., software modules, distributed software, etc.), firmware, and/or programmable circuitry, etc. In at least one embodiment, scheduler may comprise code that resides in a tangible storage medium (e.g., memory) that can be executed by one or more processors of a server. Embodiments of the methods described herein may be implemented in a system that includes one or more storage mediums having stored thereon, individually or in combination, instructions that when executed by one or more processors and/or processing units perform the methods described herein. Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Either additionally or alternatively, memory may include other and/or later-developed types of computer-readable memory. "Circuitry", as used in any embodiment herein, may include, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A server, comprising:
a set of internal ports;
at least one external port; and
a scheduler;
wherein:
said set comprises a plurality of internal ports;
each of said plurality of internal ports is configured to be coupled to and to communicate with at least one other server and included in a cluster of N interconnected servers to form a router having M router ports corresponding to the total number of external ports of all the servers in the cluster;
said at least one external port is configured to couple to and to communicate with a network or a network device to receive one of a plurality of packet flows;
said scheduler is configured to switch packets from said at least one external port to at least one of the plurality of internal ports of said set, or from one of the plurality of internal ports of said set to another one of the plurality internal ports of said set, by load balancing a packet flow comprising a plurality of packets;
said load balancing comprises randomly selecting one of said plurality of internal ports from said set to transmit each packet of said plurality of packets to a receiving interconnected server coupled to the selected internal port; and
the scheduler is further configured to switch at a processing rate that is independent of M.

2. The server of claim 1, wherein a line rate of each of said external ports is R bits per second (bps), and the scheduler is configured to switch at processing rate of c*s*R, where s represents the number of external ports of said server and c is between 2 and 3.

3. The server of claim 1, further comprising a network adapter configured to process a header of each packet of said plurality of packets to identify an output node for each of the packets and to modify a MAC address of each of the packets with queue information to enable the receiving server to identify the output node without further processing of the packet header.

4. The server of claim 1, further comprising:
a processor having a plurality of cores; and
a plurality of receive queues for receiving data from said external ports;
wherein each said receive queue is assigned to a specific packet flow of said plurality of packet flows, and wherein packet processing of said specific packet flow received by said at least one external port is distributed across said cores.

5. The server of claim 1, wherein said selecting one of said plurality of said internal ports from said set comprises:
determining a source of said one of said plurality of packet flows for said at least one external port;
determining if a packet within the identified packet flow has been received within a predetermined time interval.

6. The server of claim 1, wherein said selecting one of said plurality of said internal ports from said set comprises:
determining if an internal port is overloaded or has exceeded a predetermined threshold.

7. The server of claim 1, wherein said selecting one of said plurality of said internal ports from said set further comprises:
determining if a selected internal port has a throughput that is less than a soft limit;
determining if a selected internal port is a preferred port; and
determining if a selected internal port has a throughput less than a hard limit.

8. The server of claim 1, wherein said server is configured to interconnect with said cluster of N interconnected servers in a full mesh topology.

9. The server of claim 1, wherein said server is further configured to interconnect with a plurality of intermediate servers in a k-ary n-fly butterfly multihop topology.

10. A method, comprising:
receiving a packet flow at an external port of an input node server, wherein said input node server is one of a plurality of N node servers coupled in an interconnect topology in a cluster router, the cluster router comprising a plurality of M router ports corresponding to the total number of external ports of all the servers in the cluster, processing said packet flow to determine a destination of each of the packets of the packet flow, wherein said destination comprises an output node server of said plurality of node servers;

switching packets of said packet flow from an external port to an internal port of a set of internal ports, or from one internal port of said set to another internal port of said set, by load balancing a packet flow;

wherein:

said load balancing comprises randomly selecting, for each packet of said packet flow, one internal port of said set of internal ports to transmit each packet of said packet flow to a receiving interconnected server coupled to the selected internal port; and said switching occurs at rate that is independent of M.

11. The method of claim 10, wherein a line rate of each of said external ports is R bits per second (bps), and the switching is configured to occur at processing rate of c*s*R, where s represents the number of external ports of said server and c is between 2 and 3.

12. The method of claim 10, further comprising:

processing a packet header of each packet of said packet flow to identify an output node for each of the packets; and modifying a MAC address of each packet of said packet flow with queue information to enable the receiving server to identify an the output node without further processing of the packet header.

13. The method of claim 10, wherein:

said input node server further comprises a processor having a plurality of cores, and a plurality of receive queues for receiving data from said external port; said method further comprises:

assigning a packet flow to a receive queue; and distributing packet processing of said packet flow across said cores.

14. The method of claim 10, wherein said selecting one of said plurality of said internal ports of said set comprises:

determining a source of an identified packet flow for a given one of said external ports;

determining if a packet within the identified packet flow has been received within a predetermined time interval.

15. The method of claim 10, wherein said selecting one of said plurality of said internal ports of said set comprises:

determining if the internal port is overloaded or has exceeded a predetermined threshold.

16. The method of claim 10, wherein said selecting one of said plurality of said internal ports of said set comprises:

determining if a selected internal port has a throughput that is less than a soft limit;

determining if a selected internal port is a preferred port; and determining if a selected internal port has a throughput less than a hard limit.

17. The method of claim 10, wherein said server is configured to interconnect with said cluster of N interconnected servers in a full mesh topology.

18. The method of claim 10, wherein said server is further configured to interconnect with a plurality of intermediate servers in a k-ary n-fly butterfly multihop topology.

19. An apparatus comprising a computer-readable storage medium having stored thereon computer readable instructions that when executed by one or more processors result in the following operations, comprising:

processing a packet flow received at an external port of an input node server to determine a destination of the packets of the packet flow, wherein said destination comprises an output node server;

switching packets from said external port to one internal port of a set of internal ports of the input node server, or from one internal port of said set to another internal port of said set, by load balancing a packet flow;

wherein:

said load balancing comprises randomly selecting, for each packet of a plurality of packets within the packet flow, one of said set of internal ports to transmit each packet of said plurality of packets to another server coupled to the selected internal port;

said input node server is one of a plurality of N node servers coupled in an interconnect topology in a cluster router, the cluster router comprising a plurality of M router ports corresponding to the total number of external ports of all the servers in the cluster; and said switching occurs at rate that is independent of M.

20. The apparatus of claim 19, wherein a line rate of each of said external ports is R bits per second (bps), and the switching is configured to occur at processing rate of c*s*R, where s represents the number of external ports of said server and c is between 2 and 3.

21. The apparatus of claim 19, wherein the instructions that when executed by one or more of the processors result in the following additional operations comprising:

processing a packet header of each packet of said plurality of packets to identify an output node for each of the packets; and modifying a MAC address of each of the packets with queue information to enable the receiving server to identify the output node without further processing of the packet header.

22. The apparatus of claim 19, wherein said input node server further comprises:

a processor having a plurality of cores; and a plurality of receive queues for receiving data from said external ports;

wherein each said receive queue is assigned to a specific packet flow, and wherein packet processing of said specific packet flow is distributed across said cores.

23. The apparatus of claim 19, wherein, for the selecting operation, the instructions that when executed by one or more of the processors result in the following additional operations comprising:

determining a source of an identified packet flow for a given external port;

determining if a packet within the identified packet flow has been received within a predetermined time interval.

24. The apparatus of claim 19, wherein, for the selecting operation, the instructions that when executed by one or more of the processors result in the following additional operation comprising:

determining if the internal port is overloaded or has exceeded a predetermined threshold.

25. The apparatus of claim 19, wherein, for the selecting operation, the instructions that when executed by one or more of the processors result in the following additional operations comprising:

determining if a selected internal port has a throughput that is less than a soft limit;

determining if a selected internal port is a preferred port; and determining if a selected internal port has a throughput less than a hard limit.

26. The apparatus of claim 19, wherein said server is configured to interconnect with said cluster of N interconnected servers in a full mesh topology.

27. The apparatus of claim 19, wherein said server is further configured to interconnect with a plurality of intermediate servers in a k-ary n-fly butterfly multihop topology.

* * * * *